US006910742B2

(12) United States Patent
Flood et al.

(10) Patent No.: US 6,910,742 B2
(45) Date of Patent: *Jun. 28, 2005

(54) WHEEL

(75) Inventors: Nicholas Flood, County Westmeath (IE); Patrick Beirne, County Westmeath (IE); Thomas Mullen, County Meath (IE)

(73) Assignee: Menza Limited, County Westmeath (IE)

( * ) Notice: Subject to any disclaimer, the term of this patent is extended or adjusted under 35 U.S.C. 154(b) by 0 days.

This patent is subject to a terminal disclaimer.

(21) Appl. No.: 10/216,244

(22) Filed: Aug. 12, 2002

(65) Prior Publication Data

US 2003/0234572 A1 Dec. 25, 2003

Related U.S. Application Data

(60) Provisional application No. 60/389,505, filed on Jun. 19, 2002.

(51) Int. Cl.[7] .......................... B60B 23/00; B60B 27/02; B60B 37/00
(52) U.S. Cl. ............... 301/119; 301/111.01; 301/111.03
(58) Field of Search ...................... 301/111.01, 111.03, 301/112, 119, 121, 122, 111.04, 111.07

(56) References Cited

U.S. PATENT DOCUMENTS

| 882,441 | A | * | 3/1908 | Wilson | 301/119 |
|---|---|---|---|---|---|
| 4,358,162 | A | | 11/1982 | Schneider et al. | 301/63 |
| 4,544,425 | A | | 10/1985 | Provolo | 156/73 |
| 4,641,878 | A | | 2/1987 | Petersson | 295/49 |
| 5,368,371 | A | | 11/1994 | Markling | 301/64 |
| 5,408,854 | A | | 4/1995 | Chiu | 70/225 |
| 5,529,385 | A | * | 6/1996 | Tsao | 301/111.06 |
| 5,884,982 | A | * | 3/1999 | Yemini | 301/111.03 |
| 5,902,018 | A | * | 5/1999 | Owen et al. | 301/111.04 |
| 6,056,369 | A | * | 5/2000 | Lin | 301/111.06 |
| 6,170,920 | B1 | | 1/2001 | Markling | 301/111 |
| 6,234,582 | B1 | * | 5/2001 | Wu | 301/111.06 |
| 6,273,520 | B1 | * | 8/2001 | Liao | 301/111.06 |
| 6,280,001 | B1 | * | 8/2001 | Parker et al. | 301/112 |
| 6,361,121 | B1 | | 3/2002 | Morris | 301/112 |
| 6,375,274 | B1 | | 4/2002 | Morris | 301/111 |
| 6,464,305 | B2 | | 10/2002 | Markling | 301/111 |
| 6,520,597 | B1 | | 2/2003 | Markling | 301/64 |
| 6,523,910 | B1 | * | 2/2003 | Lin | 301/111.06 |
| 6,637,835 | B2 | | 10/2003 | Morris | |
| 2003/0000856 | A1 | | 5/2003 | Markling | |
| 2003/0117009 | A1 | * | 6/2003 | Flood et al. | |

FOREIGN PATENT DOCUMENTS

| EP | 0083451 B1 | 7/1983 |
|---|---|---|
| EP | 0359947 B1 | 3/1990 |
| EP | 0508902 A1 | 10/1992 |

* cited by examiner

*Primary Examiner*—Russell D. Stormer
*Assistant Examiner*—Jason R. Bellinger
(74) *Attorney, Agent, or Firm*—Jacobson Holman

(57) ABSTRACT

A journal for coupling a wheel to an axle has a main tubular body portion with a reception space for the axle and a separate locking element. The locking element is mounted in a cradle for pivotal movement about a pivot axis from a release position in which the axle is removable from the reception space to a position in which the axle is secured in position is the reception space. A biasing member such as a magnet, a spring or a tube of resilient material biases the locking element into the secured position.

41 Claims, 19 Drawing Sheets

WHEEL

This is a complete application claiming benefit of provisional 60/389,505 filed Jun. 19, 2002.

INTRODUCTION

The invention relates to an assembly for coupling a wheel to an axle, and in particular to a blow moulded plastic wheel for use with a roll-out refuse bin of the type used for street-side refuse collections. Such refuse bins are commonly referred to as "wheelie bins" or "trash carts".

Because of the heavy duty required of such bins it is essential that the bin wheels are securely coupled to an axle. Various attempts have been made to provide retaining systems for coupling a bin wheel to an axle. Known systems however are of complex or bulky construction, often requiring several parts and involving complex assembly.

This invention is therefore directed towards providing a relatively simple blow moulded wheel which can be easily and securely coupled to an axle.

STATEMENTS OF INVENTION

According to the invention, there is provided a journal for coupling a wheel to an axle. The journal is configured to be mounted in a bore of a wheel. The journal has a reception space for receiving an axle and the journal comprises a locking element pivotable about a pivot axis substantially parallel to a longitudinal axis of the reception space between a release position in which an axle is removable from the reception space and a secured position in which an axle is secured in position in the reception space.

In one embodiment of the invention the pivot axis is radially offset from the longitudinal axis of the reception space.

In a preferred case the journal comprises a main body portion, the locking element being separate from the main body portion. Ideally the locking element is mounted to the main body portion. The locking element may comprise a pivot extension for location in a co-operating pivot receiver of the main body portion. Most preferably the locking element comprises a pair of oppositely directed pivot extensions for location in a pair of co-operating pivot receivers of the main body portion. The pivot extension may be locatable in the pivot receiver in a snap-fit manner.

In another embodiment the journal comprises means to bias the locking element towards the secured position. Preferably the biasing means repels the locking element to bias the locking element towards the secured position. In another case the biasing means attracts the locking element to bias the locking element towards the secured position. The biasing means may comprise a resilient member.

In one case the resilient member 316 is tubular. Ideally the resilient member is of a plastics material.

In another case the resilient member comprises a coiled spring.

In a further case the biasing means comprises a magnet.

The locking element may comprise a locking arm and an actuating arm. Ideally the pivot axis is located at the junction of the locking arm and the actuating arm. The actuating arm may be pivotable to pivot the locking arm between the secured position and the release position. Preferably the actuating arm is biased to bias the locking arm towards the secured position.

In a particularly preferred embodiment the journal comprises an accessway through which access may be gained to move the locking element between the secured position and the release position. The locking element may comprise an engagement formation for moving the locking element between the secured position and the release position. Preferably the engagement formation comprises a recess.

In another case the journal comprises means to secure the journal in position in a bore of a wheel. The securing means preferably comprises a lip engagable with a shoulder defined on a wheel. Ideally the lip is engagable with a shoulder defined by an open mouth of a bore. In another case the lip is engagable with a shoulder defined within a bore. The lip may be engagable with a shoulder which extends circumferentially around a bore. Preferably the journal comprises a lip at each end of the journal. Most preferably the lip is movable between a release position in which the journal is removable from a bore and a secured position in which the journal is secured in position in a bore. Ideally the lip is biased towards the secured position. In a preferred case the lip is provided in the form of at least one protrusion at an end of at least one cantilever arm.

In another aspect of the invention, there is provided a journal for coupling a wheel to an axle. The journal is configured to be mounted in a bore of a wheel. The journal has a reception space for receiving an axle and the journal comprises a main body portion and a separate locking element. The locking element is pivotable relative to the main body portion between a release position in which an axle is removable from the reception space and a secured position in which an axle is secured in position in the reception space.

The invention also provides, in another aspect, a journal for coupling a wheel to an axle. The journal is configured to be mounted in a bore of a wheel. The journal has a reception space for receiving an axle and the journal comprises a locking element movable between a release position in which an axle is removable from the reception space and a secured position in which an axle is secured in position in the reception space and magnetic biassing means to bias the locking element towards the secured position.

In a further aspect the invention provides a journal for coupling a wheel to an axle. The journal is configured to be mounted in a bore of a wheel. The journal has a reception space for receiving an axle, and the journal comprises a locking element movable between a release position in which an axle is removable from the reception space and a secured position in which an axle is secured in position in the reception space and means to bias the locking element towards the secured position. The biassing means comprises a resilient member of a plastics material.

Preferably the resilient member is tubular.

According to another aspect of the invention, there is provided a wheel assembly comprising a wheel, and a journal for coupling the wheel to an axle. The journal is configured to be mounted in a bore of the wheel. The journal has a reception space for receiving an axle and the journal comprises a locking element pivotable about a pivot axis substantially parallel to a longitudinal axis of the reception space between a release position in which an axle is removable from the reception space and a secured position in which an axle is secured in position in the reception space.

In one embodiment the wheel has an outer rim and an inner hub with a central bore. Preferably the wheel is of moulded plastic.

In another aspect of the invention there is provided a wheel having an outer rim and an inner hub with a central bore, the wheel defining an engagement surface in the bore, the engagement surface extending circumferentially around the bore for engagement with at least part of a journal to secure the journal in the bore.

In one embodiment the engagement surface is provided by a radially inwardly protruding shoulder.

The invention also provides, in a further aspect, an axle assembly comprising an axle, and a journal for coupling the axle to a wheel. The journal is configured to be mounted in a bore of a wheel. The journal has a reception space for receiving the axle and the journal comprises a locking element pivotable about a pivot axis substantially parallel to a longitudinal axis of the reception space between a release position in which the axle is removable from the reception space and a secured position in which the axle is secured in position in the reception space.

In one case the axle comprises a recess for receiving the locking element in the secured position. The recess may comprise a groove in an outer surface of the axle. Preferably the groove extends radially inwardly of the outer surface. Ideally the groove extends circumferentially around the axle.

In a further aspect of the invention, there is provided an assembly of a wheel, an axle, and a journal for coupling the wheel to the axle. The journal is configured to be mounted in a bore of the wheel. The journal has a reception space for receiving the axle and the journal comprises a locking element pivotable about a pivot axis substantially parallel to a longitudinal axis of the reception space between a release position in which the axle is removable from the reception space and a secured position in which the axle is secured in position in the reception space.

According to another aspect, the invention also provides a bin or trash cart comprising an assembly of a wheel, an axle, and a journal for coupling the wheel to the axle. The journal being configured to be mounted in a bore of the wheel. The journal having a reception space for receiving the axle and the journal comprises a locking element pivotable about a pivot axis substantially parallel to a longitudinal axis of the reception space between a release position in which the axle is removable from the reception space and a secured position in which the axle is secured in position in the reception space.

BRIEF DESCRIPTION OF THE DRAWINGS

The invention will be more clearly understood from the following description of some embodiments thereof, given by way of example only, with reference to the accompanying drawings, in which.

DETAILED DESCRIPTION

Figure 1:
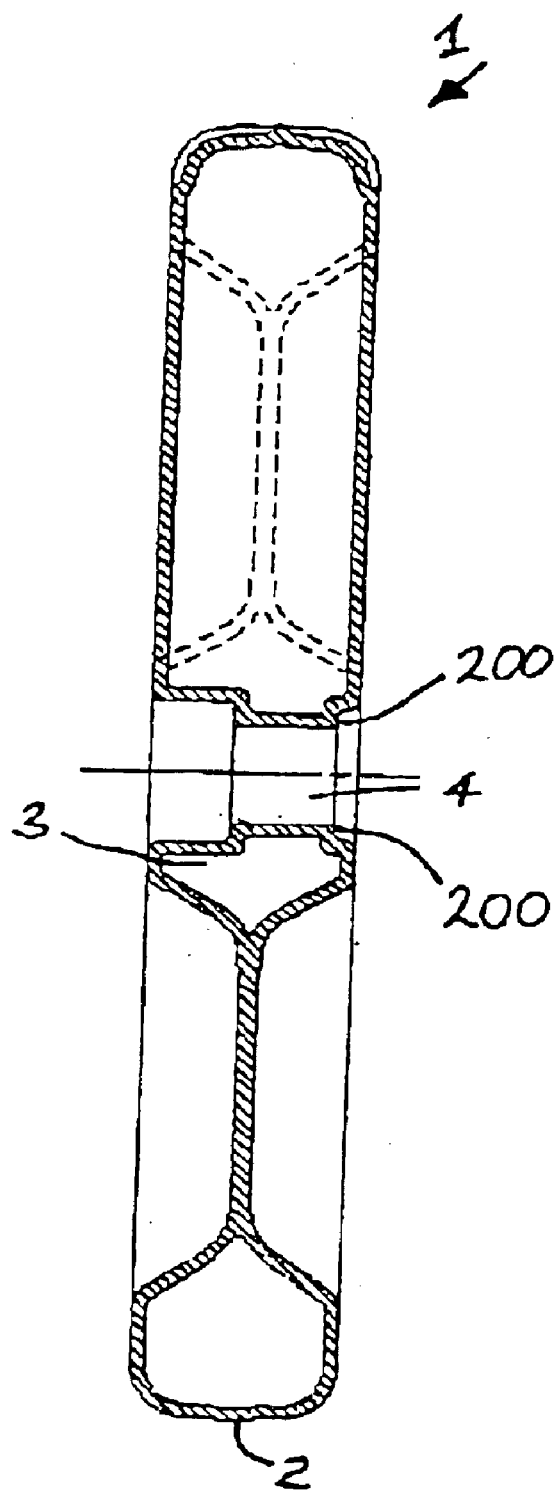
FIG. 1 is a cross-sectional, side view of a wheel.
Figure 2:
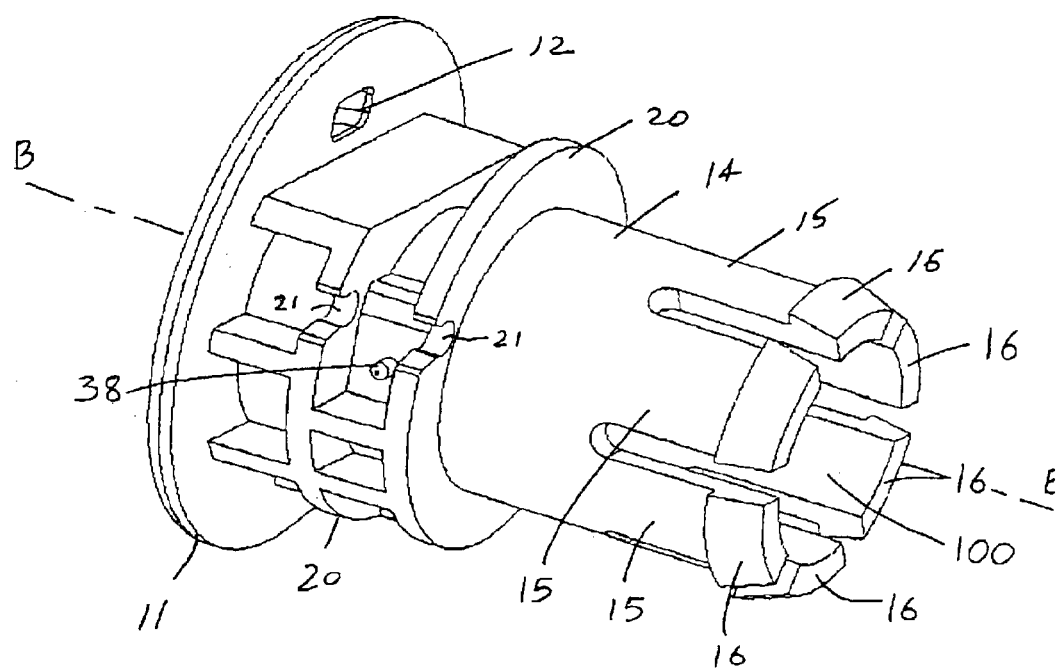
FIG. 2 is a perspective view of a main body portion of a journal according to the invention.

Referring to the drawings and initially to FIGS. 1 to 11 thereof, there is illustrated a journal 6 according to the invention which is suitable for coupling a wheel to an axle. In use the journal 6 is mounted in a bore of a wheel, and the journal 6 has a reception space 100 for receiving an axle.

In this case the wheel 1 is a blow molded plastic wheel having an outer treaded rim 2 and an inner hub 3 (FIG. 1). A central bore 4 is provided through the hub 3 with a radially inwardly protruding shoulder formation 200 defined in the bore 4 towards an inner end of the hub 3. The shoulder 200 extends circumferentially around the bore 4.

The axle 5 has a groove 46 extending radially inwardly of an outer surface of the axle 5, and extending circumferentially around the axle 5 (FIG. 1). The leading end of the axle 5 has a chamfered edge 101.

Figure 3:
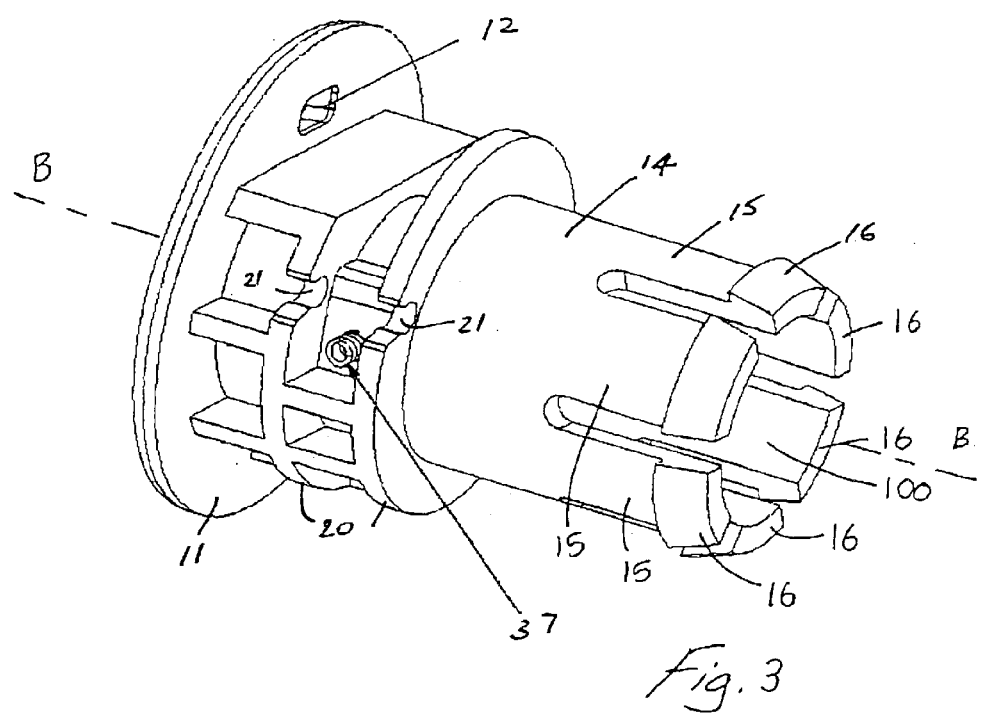
FIG. 3 is a perspective view of a coiled spring mounted to the main body portion of FIG. 2.
Figure 4:
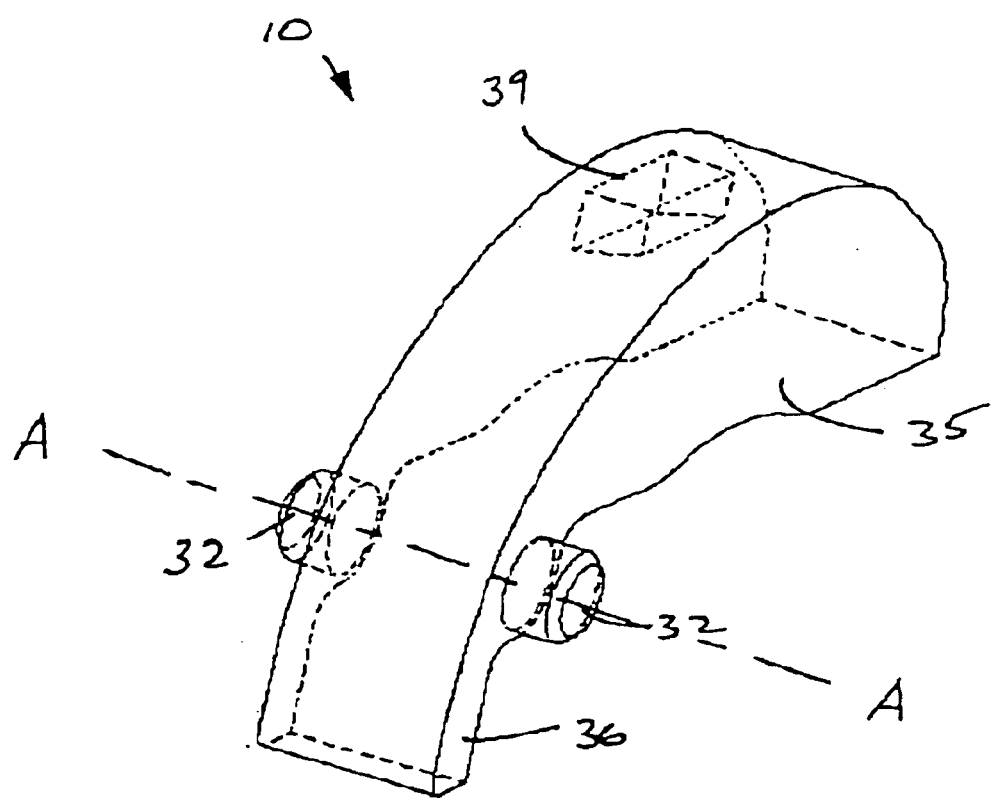
FIG. 4 is a perspective view of a locking element of a journal according to the invention.

The journal 6 comprises a tubular main body portion 14 (FIGS. 2 and 3), and a separate locking element 10 (FIG. 4).

The main body portion 14 comprises an outer cap 11 at the outermost end, and is divided into six axially extending cantilever arm segments 15 at the innermost end. The arms 15 are movable in a cantilever manner between a release position in which the journal 6 may be moved into and out of the bore 4, and a secured position in which the journal 6 is secured in position in the bore 4.

Radially outwardly protruding lips 16 are formed at the innermost ends of each arm 15. The lips 16 have chamfered edges.

An accessway 12 is defined through the outer cap 11 to facilitate access to the journal 6 through the cap 11, for example with a tool, such as a screwdriver. The accessway 12 is normally covered with a thin layer of plastic to prevent ingress of dirt into the journal 6.

Two axially spaced-apart outwardly projecting collars 20 are provided between the cap 11 and the arms 15 to reinforce the journal 6. A pivot receiving cradle 21 is formed in each collar 20.

The journal 6 comprises a coiled compression spring 37 mounted around an outwardly protruding spigot 38 between the collars 20.

The locking element 10 comprises a locking arm 35 and an integral actuating arm 36. A pivot axis A-A passes through the locking element 10 at the junction of the locking arm 35 and the actuating arm 36 (FIG. 4) A pair of oppositely directed pivot extensions 32 are formed extending outwardly from the locking element 10 along the pivot axis A-A.

An engagement recess 39 is provided in the locking arm 35 to enable the locking element 10 to be engaged, for example by a tool, such as a screwdriver.

A suitable material for the locking element 10 is a metallic material or a plastics material.

Figure 5:
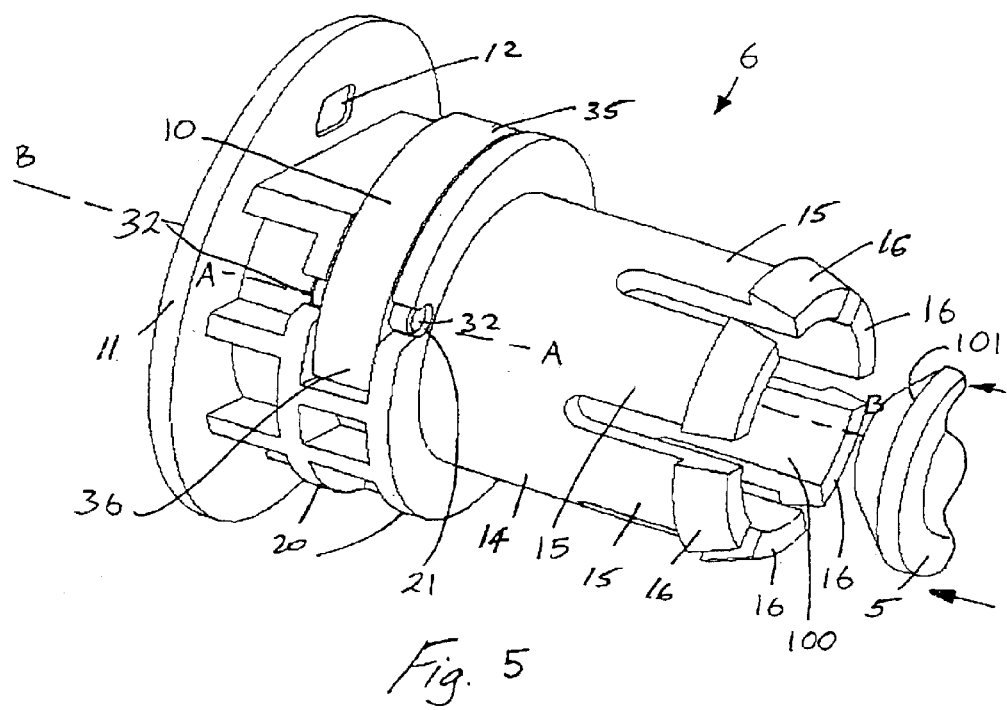
FIG. 5 is a perspective view of an assembled journal according to the invention.

The journal 6 is assembled by mounting the coiled spring 37 around the spigot 38 (FIG. 3). The locking element 10 is then mounted to the main body portion 14 by locating the pivot extensions 32 into the co-operating pivot cradles 21 in a snap-fit manner (FIG. 5).

Figure 6:
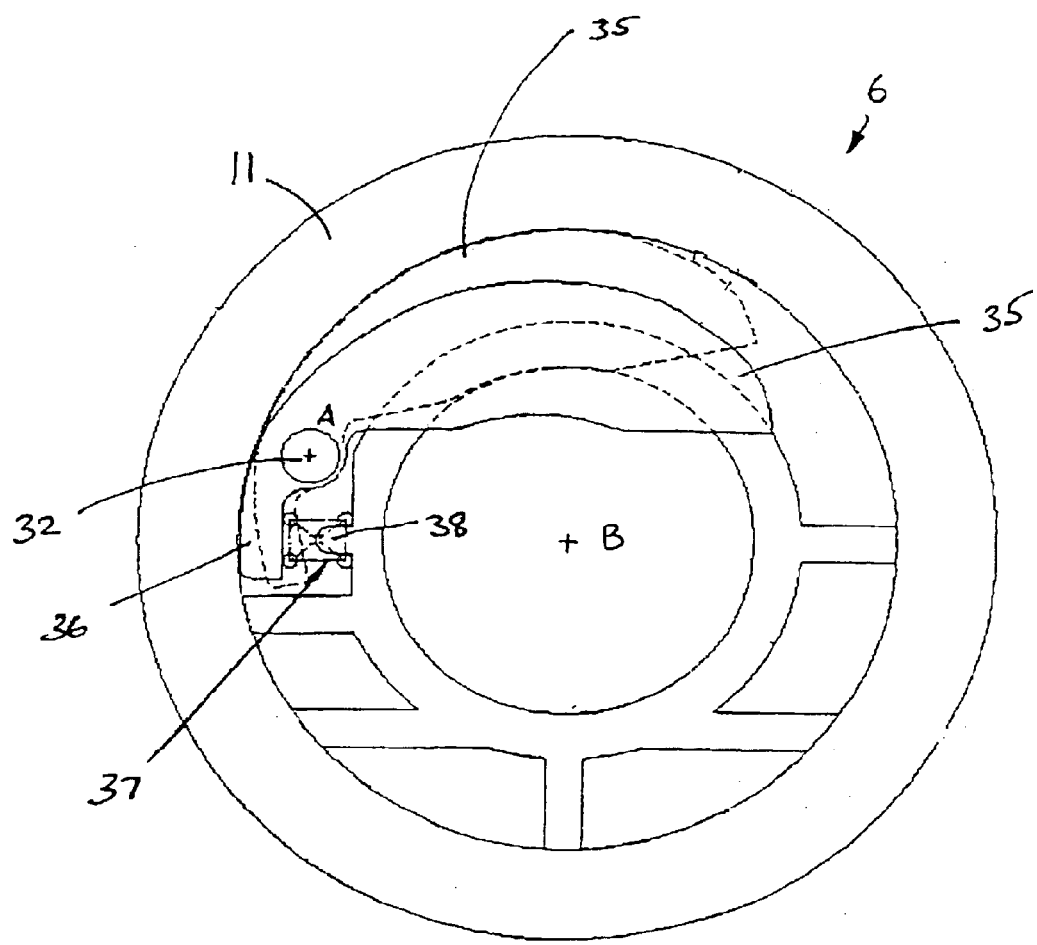
FIG. 6 is a cross-sectional, front view of the journal of FIG. 5.
Figure 11:
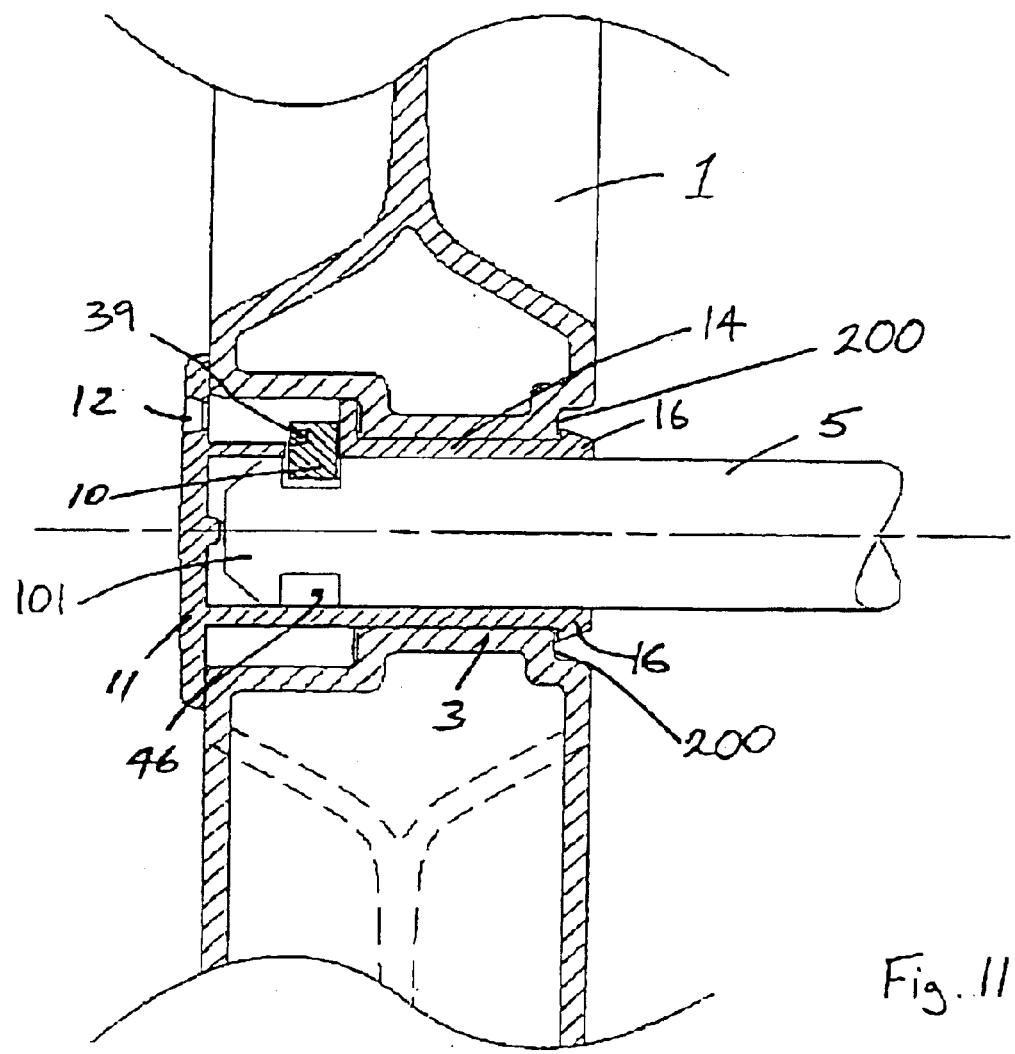
FIG. 11 is a cross-sectional, side view of the wheel, journal and axle of FIGS. 9 and 10.

When assembled, the locking element 10 is pivotable about the pivot axis A-A between a release position, indicated by dashed lines in FIG. 6, and a secured position, indicated by full lines in FIG. 6. With the locking element 10 in the release position, the axle 5 is movable into and out of the reception space 100 defined by the tubular main body portion 14. With the locking element 10 in the secured position, the locking arm 35 is engaged with the axle groove 46 to secure the axle 5 in position in the reception space 100 (FIG. 11).

The coiled spring 37 bears against the actuating arm 36 of the locking element 10 to repel the actuating arm 10 and thereby bias the locking arm 35 towards the secured position. The spring 37 provides a particularly low cost and simple means of biasing the locking arm 35 towards the secured position.

Figure 7:
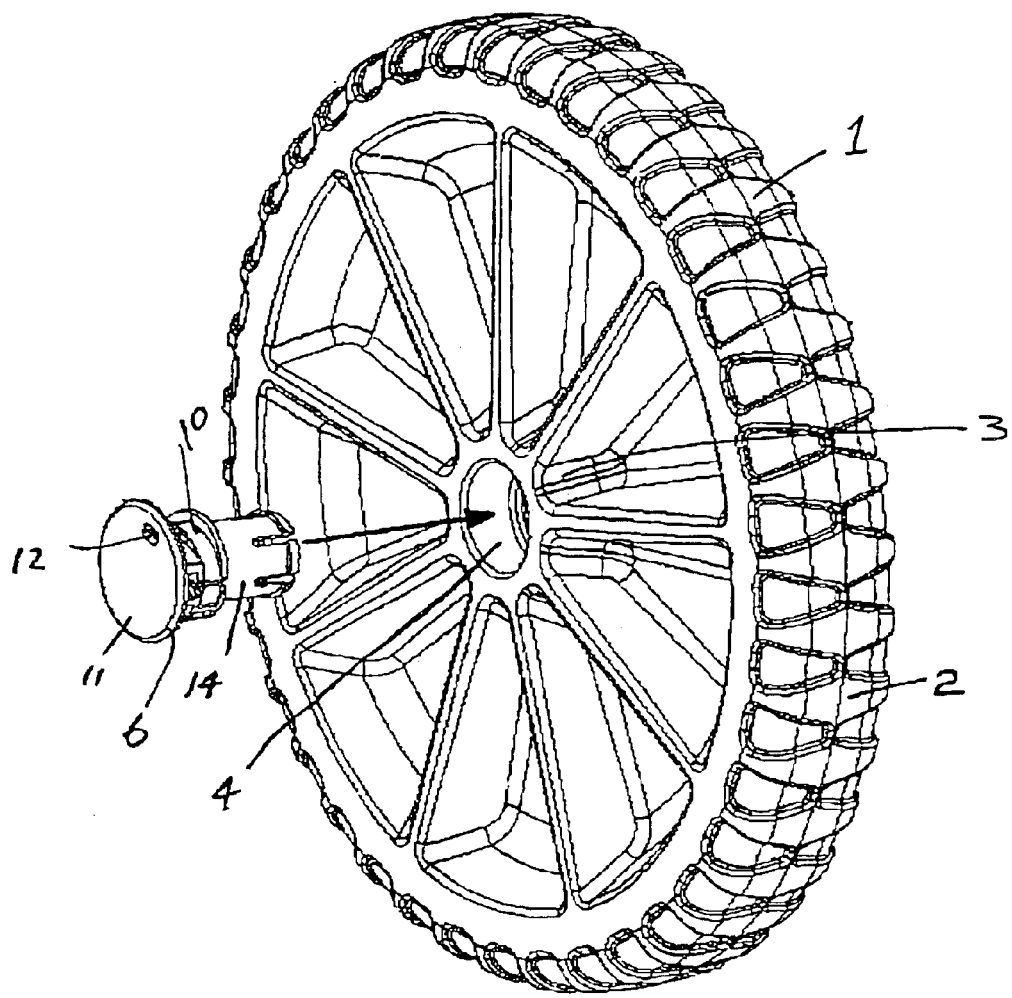
FIGS. 7 and 8 are perspective views illustrating coupling of the journal of FIG. 5 to a wheel.

The journal 6 is coupled to the wheel 1 by inserting the arms 15 into the bore 4 of the wheel 1 from the front or cap side (FIG. 7). As the arms 15 enter the bore 4, the arms 15 are pivoted inwardly to the release position by a camming engagement of the chamfered lips 16 with the internal wall of the bore 4.

Figure 8:
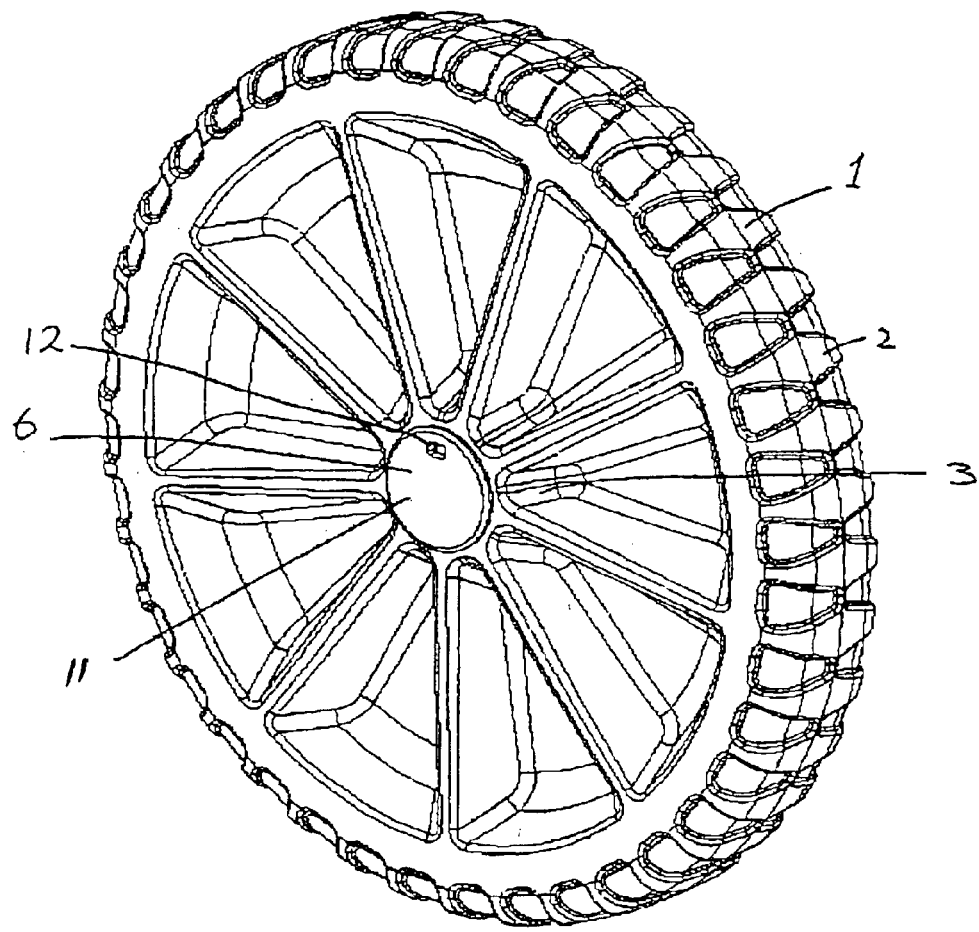
Figure 9:
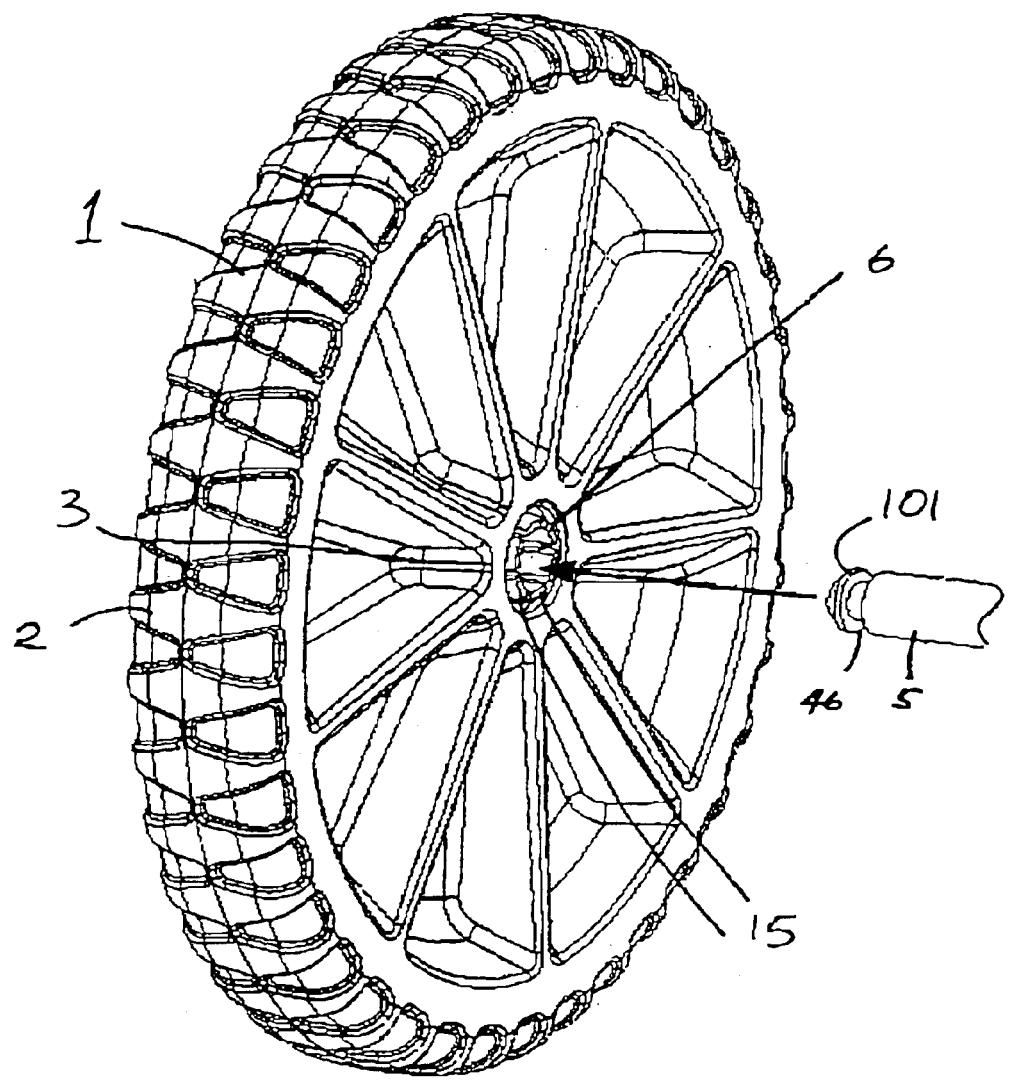
FIGS. 9 and 10 are perspective views illustrating coupling of an axle to the journal and the wheel of FIGS. 7 and 8.

When the lips 16 reach the shoulder 200, the lips 16 move outwardly to the secured position under the biasing action of the cantilever arms 15 to engage with the annular shoulder 200 (FIG. 8). The cap 11 engages with the shoulder defined by the open mouth of the bore 4 at the outer end of the hub 3 (FIG. 8). In this manner the journal 6 is secured in position in the bore 4.

By engaging the lips 16 with the annular shoulder 200 at points around the circumference of the shoulder 200, this arrangement provides for a particularly secure coupling of the journal 6 to the wheel 1.

Figure 10:
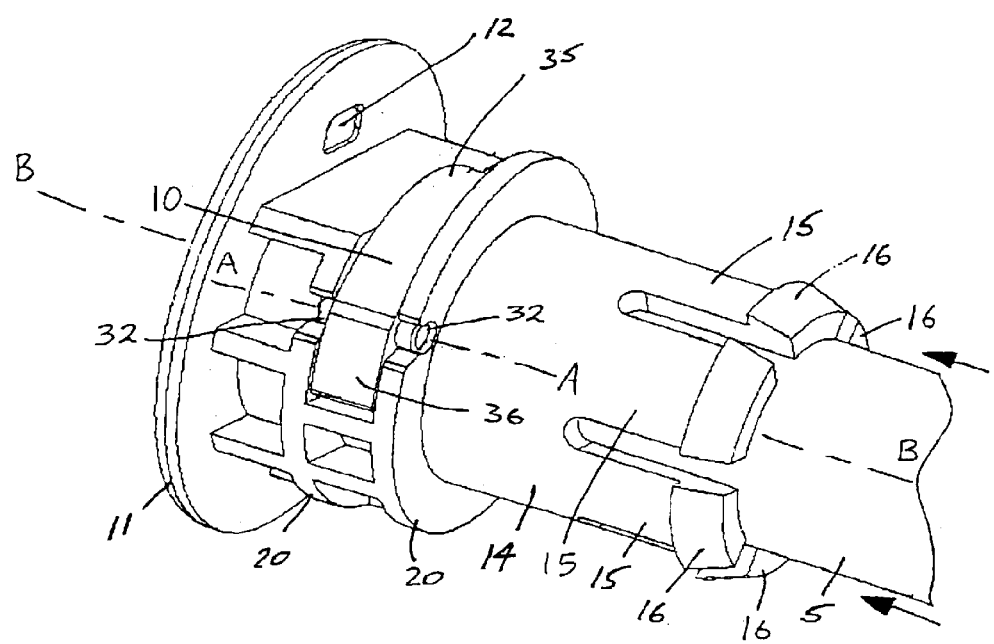

To couple the axle 5 to the journal 6, the leading end 101 of the axle 5 is inserted into the reception space 100 of the main body portion 14 (FIG. 9), and the axle 5 is advanced (FIG. 10). As the leading end 101 passes the locking element 10, the locking arm 35 is pivoted from the secured position to the release position by a camming engagement of the chamfered leading end 101 with the locking arm 35. This pivoting of the locking element 10 causes the spring 37 to compress.

When the leading end 101 reaches the cap 11, the axle groove 46 is aligned with the locking element 10. Under the biasing action of the coiled spring 37, the locking arm 35 is pivoted from the release position to the secured position (FIG. 11). The axle 5 is thus secured in position within the reception space 100 of the journal 6. It is noted that the pivot axis A-A defined by the pivot extensions 32 about which the locking element 10 pivots is substantially parallel to the longitudinal axis B-B of the reception space 100 of the main body portion 14 (FIG. 5). In addition the pivot axis A-A is radially offset from the longitudinal axis B-B of the reception space 100 of the main body portion 14 (FIG. 6). This arrangement facilitates the location of a relatively large locking element 10 with the relatively small space available within the wheel bore 4. Thus the locking element 10 may have a substantial area of engagement with the axle 5 to assist in distributing the forces generated during use of the wheel 1.

If it is desired to remove the axle 5 from the journal 6, for example to facilitate replacement of the wheel 1, a simple pointed tool, such as a flat blade screwdriver, may be used to pierce the thin layer of plastic covering the accessway 12, and then may be inserted through the accessway 12 into the engagement recess 39. The locking arm 35 is then levered up out of the axle groove 46 from the secured position to the release position to enable the axle 5 to be withdrawn from the reception space 100 of the journal 6.

By forming the journal 6 from the separate components of the main body portion 14 and the locking element 10, this results in a simple journal 6 which is relatively easy to manufacture. In addition the locking element 10 may conveniently be mounted to the separate main body portion 14 in a simple snap-fit arrangement.

Figure 12:
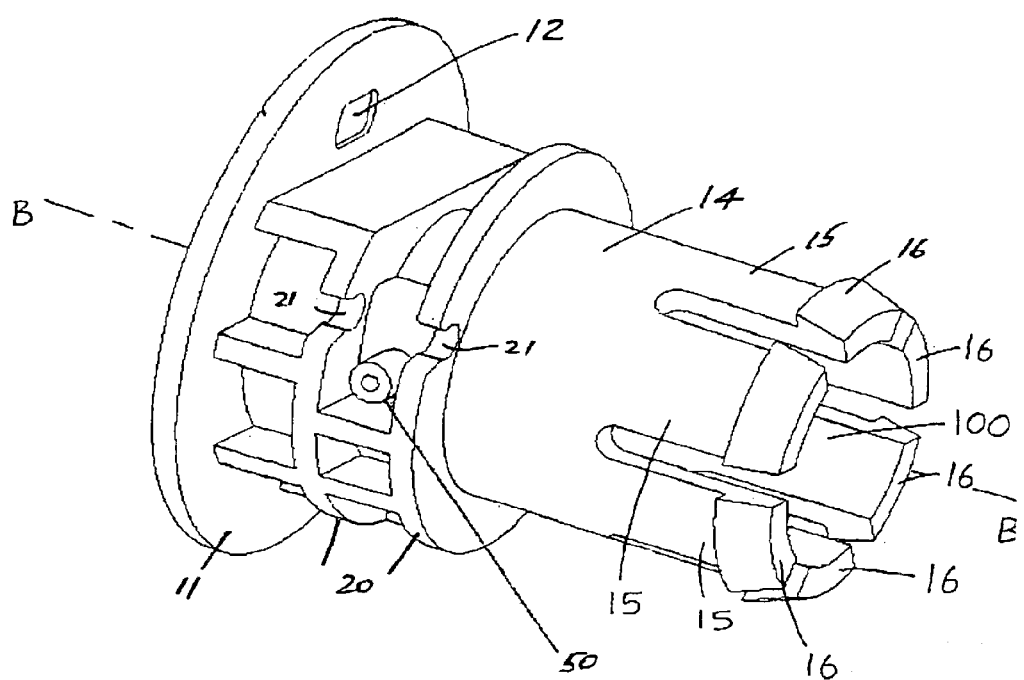
FIGS. 12 and 13 are views similar to FIGS. 3 and 6 of another journal according to the invention.
Figure 13:
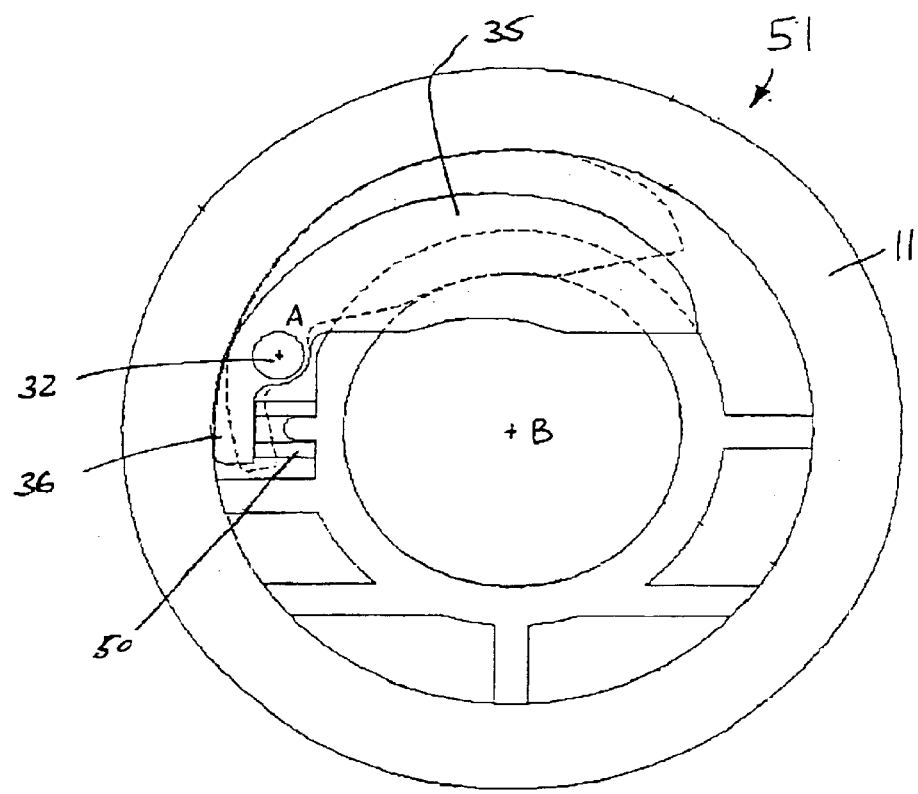
Figure 14:
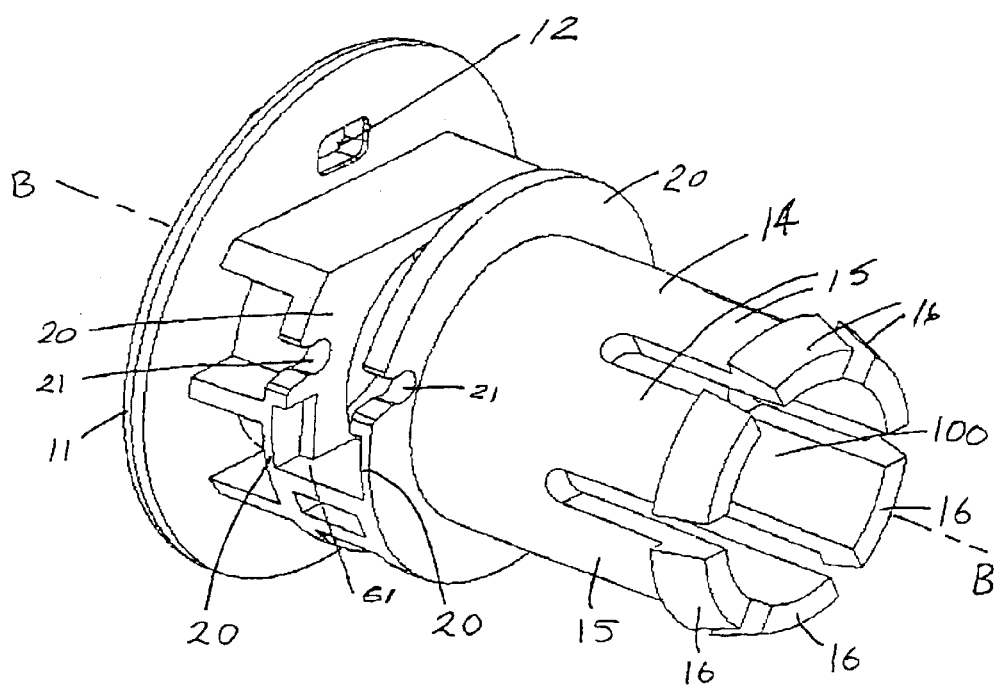
FIGS. 14 to 19 are views similar to FIGS. 2 to 6 and 10 respectively of another journal according to the invention.
Figure 15:
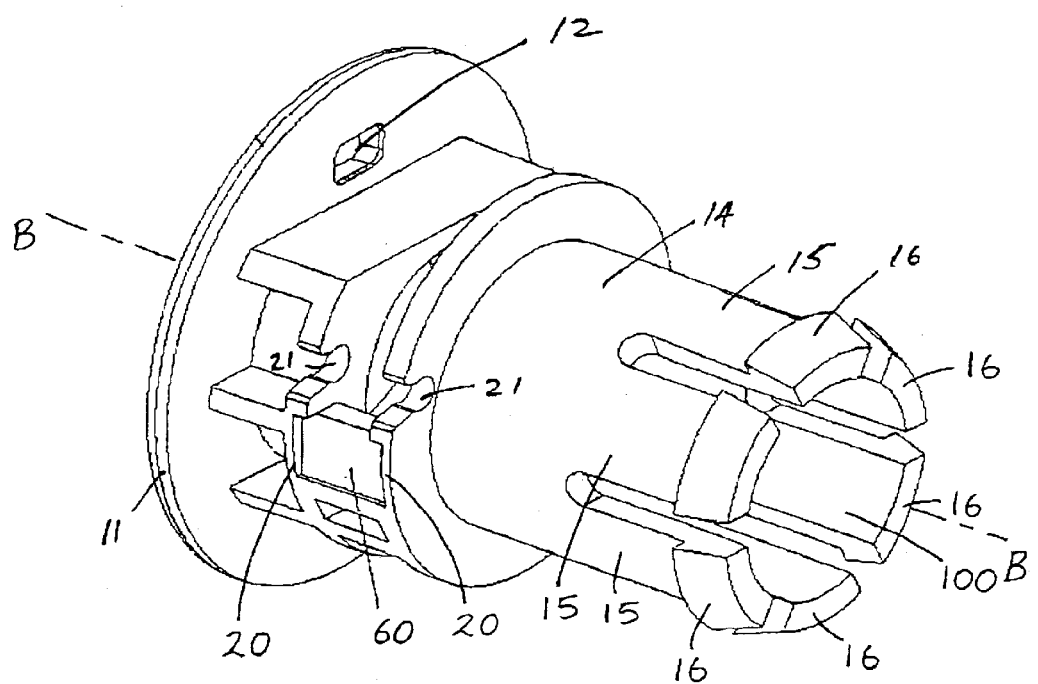
Figure 16:
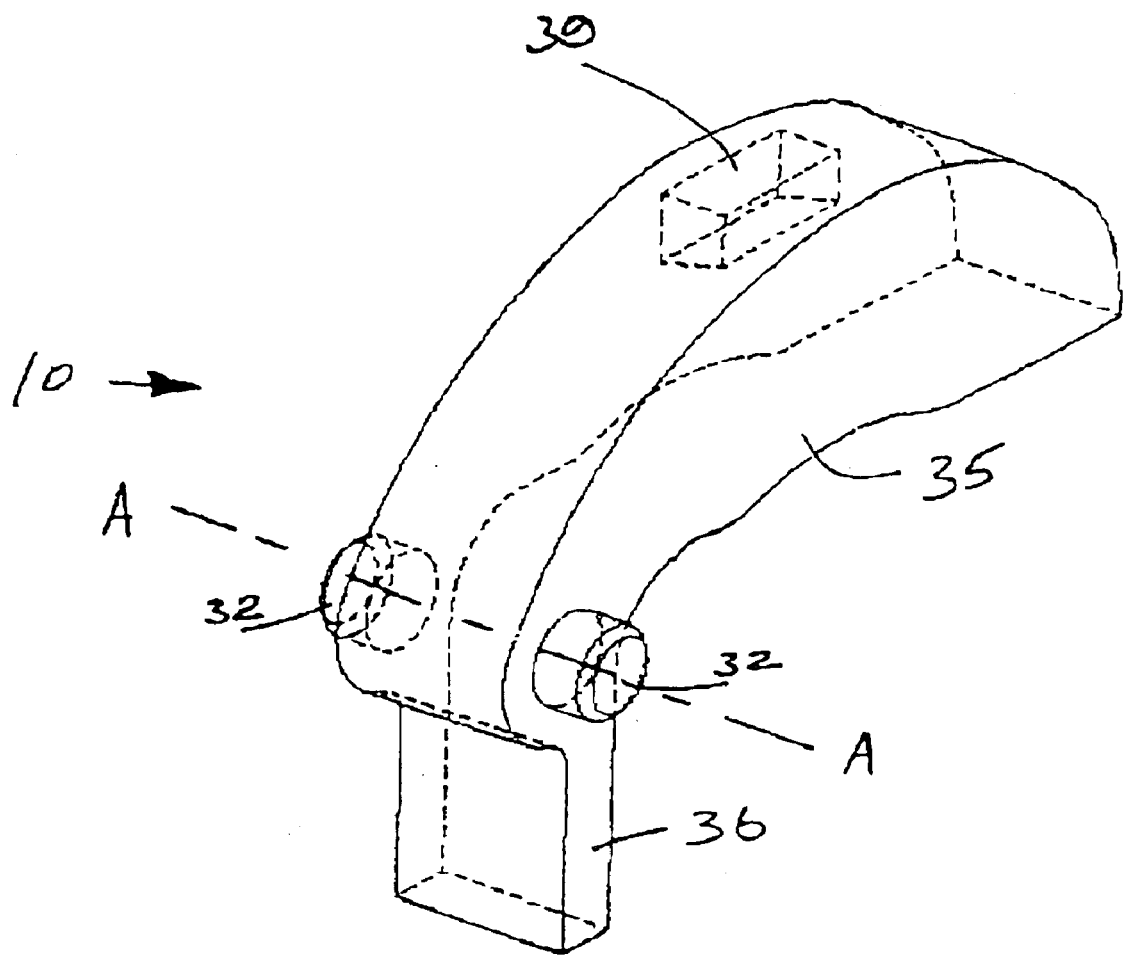
Figure 17:
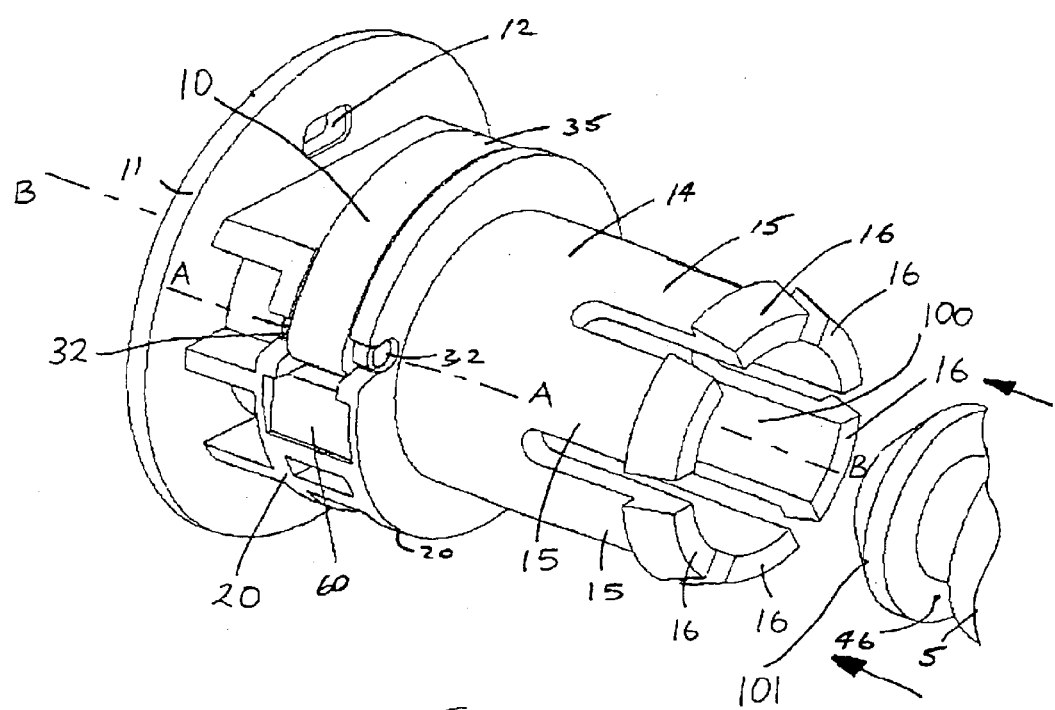

In FIGS. 12 and 13 there is illustrated another journal 51 according to the invention, which is similar to the journal 6 of FIGS. 1 to 11, and similar elements in FIGS. 12 and 13 are assigned the same reference numerals.

In this case the journal 51 comprises a resilient tube 50 of a plastics material, or of rubber or silicone, mounted between the collars 20 in place of the coiled spring. The choice of material for the tube 50 may depend on the operational temperature requirements.

The tube 50 bears against the actuating arm 36 of the locking element 10 and thereby biases the locking arm 35 towards the secured position.

The use of the tube 50 rather than the coiled spring may be more convenient for assembly of the journal 51.

Referring to FIGS. 14 to 19 there is illustrated another journal 10 according to the invention, which is similar to the journal 6 of FIGS. 1 to 11, and similar elements in FIGS. 14 to 19 are assigned the same reference numerals.

The journal 110 comprises, in this case, a magnet 60 located in a recess 61 between the collars 20 in place of the coiled spring. The magnet 60 may be a press fit in the recess 61, or may be held in position by a retaining means, or may be insert moulded in position.

The magnet force exerted by the magnet 60 attracts the metallic actuating arm 36 to bias the locking arm 35 towards the secured position.

Figure 18:
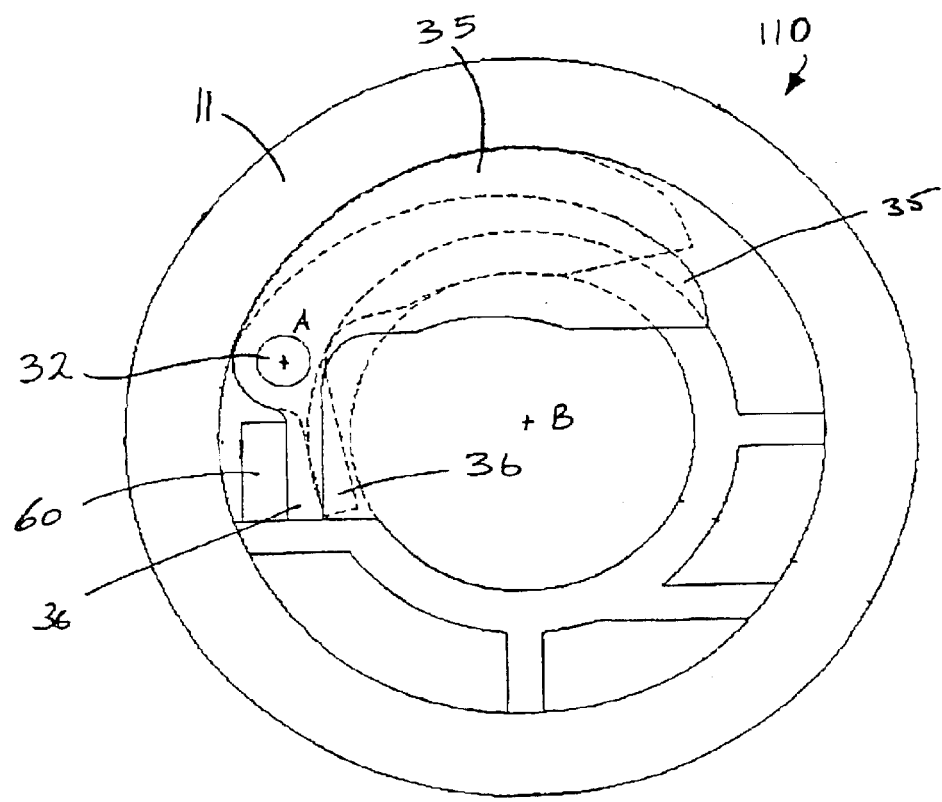
Figure 19:
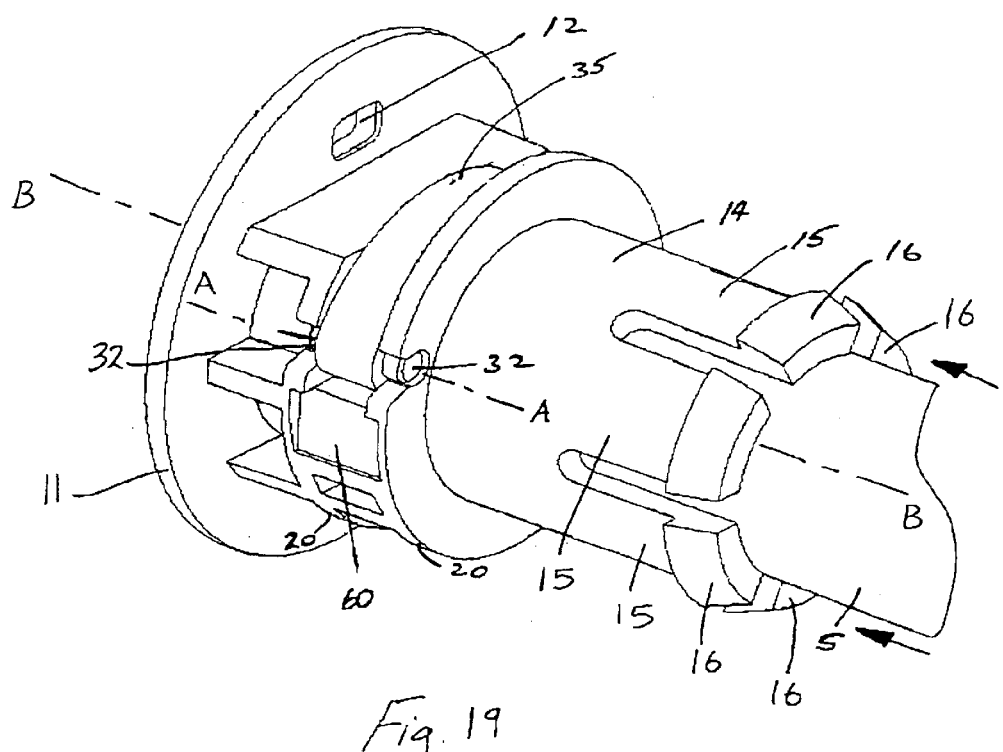

As illustrated in FIG. 18, the actuating arm 36 is located radially inwardly of the biasing magnet 60 in this case.

The locking element 10 may be of or contain a metal which may be sintered. The main body portion 14 of the journal may be of moulded plastic material.

Thus, the invention provides a wheel with an axle retaining system that is of relatively simple construction. The retaining system is easy to assemble to and from an axle.

The invention is not limited to the embodiments hereinbefore described, with reference to the accompanying drawings, which may be varied in construction and detail.

What is claimed is:

1. A journal for coupling a wheel to an axle, the journal being configured to be mounted in a bore of the wheel, the journal having a reception space for receiving the axle, the journal comprising:

a locking element pivotable about a pivot axis substantially parallel to a longitudinal axis of the reception space between a release position in which the axle is removable from the reception space and a secured position in which the axle is secured in position in the reception space.

2. The journal as claimed in claim 1, wherein the pivot axis is radially offset from the longitudinal axis of the reception space.

3. The journal as claimed in claim 1, wherein the journal comprises a main body portion, the locking element being separate from the main body portion.

4. The journal as claimed in claim 3, wherein the locking element is mounted to the main body portion.

5. The journal as claimed in claim 4, wherein the locking element comprises a pivot extension for locating in a co-operating pivot receiver of the main body portion.

6. The journal as claimed in claim 5, wherein the locking element comprises a pair of oppositely directed pivot extensions for locating in a pair of co-operating pivot receivers of the main body portion.

7. The journal as claimed in claim 5, wherein the pivot extension is locatable in the pivot receiver in a snap-fit manner.

8. The journal as claimed in claim 1, wherein the journal comprises means to bias the locking element towards the secured position.

9. The journal as claimed in claim 8, wherein the biasing means repels the locking element to bias the locking element towards the secured position.

10. The journal as claimed in claim 8, wherein the biasing means attracts the locking element to bias the locking element towards the secured position.

11. The journal as claimed in claim 8, wherein the biasing means comprises a resilient member.

12. The journal as claimed in claim 11, wherein the resilient member is tubular.

13. The journal as claimed in claim 11, wherein the resilient member is of a plastic for grammatical clarity material.

14. The journal as claimed in claim 11, wherein the resilient member comprises a coiled spring.

15. The journal as claimed in claim 11, wherein the biasing means comprises a magnet.

16. The journal as claimed in claim 1, wherein the locking element comprises a locking arm and an actuating arm.

17. The journal as claimed in claim 16, wherein the pivot axis is located at the junction of the locking arm and the actuating arm.

18. The journal as claimed in claim 16, wherein the actuating arm is pivotable to pivot the locking arm between the secured position and the release position.

19. The journal as claimed in claim 16, wherein the actuating arm is biased to bias the locking arm towards the secured position.

20. The journal as claimed in claim 1, wherein the journal comprises an accessway through which access may be gained to move the locking element between the secured position and the release position.

21. The journal as claimed in claim 1, wherein the locking element comprises an engagement formation for moving the locking element between the secured position and the release position.

22. The journal as claimed in claim 21, wherein the engagement formation comprises a recess.

23. The journal as claimed in claim 1, wherein the journal comprises means to secure the journal in position in the bore of the wheel.

24. The journal as claimed in claim 23, wherein the securing means comprises a lip engagable with a shoulder defined on the wheel.

25. The journal as claimed in claim 24 wherein the lip is engagable with the shoulder defined by an open mouth of the bore.

26. The journal as claimed in claim 24, wherein the lip is engagable with the shoulder defined within the bore.

27. The journal as claimed in claim 24, wherein the lip is engagable with the shoulder which extends circumferentially around the bore.

28. The journal as claimed in claim 24, wherein the journal comprises a lip at each end of the journal.

29. The journal as claimed in claim 24, wherein the lip is movable between a release position in which the journal is removable from the bore and a secured position in which the journal is secured in position in the bore.

30. The journal as claimed in claim 29, wherein the lip is biased towards the secured position.

31. The journal as claimed in claim 24, wherein the lip is provided in the form of at least one protrusion at an end of at least one cantilever arm.

32. A wheel assembly comprising:
a wheel, and a journal for coupling the wheel to an axle; the journal being configured to be mounted in a bore of the wheel;
the journal having a reception space for receiving the axle; and
the journal comprising a locking element pivotable about a pivot axis substantially parallel to a longitudinal axis of the reception space between a release position in which the axle is removable from the reception space and a secured position in which the axle is secured in position in the reception space.

33. The wheel assembly as claimed in claim 32, wherein the wheel has an outer rim and an inner hub with a central bore.

34. The wheel assembly as claimed in claim 32, wherein the wheel is of molded plastic.

35. An axle assembly comprising
an axle, and a journal for coupling the axle to a wheel; the journal being configured to be mounted in a bore of the wheel;
the journal having a reception space for receiving the axle; and
the journal comprising a locking element pivotable about a pivot axis substantially parallel to a longitudinal axis of the reception space between a release position in which the axle is removable from the reception space and a secured position in which the axle is secured in position in the reception space.

36. The axle assembly as claimed in claim 35, wherein the axle comprises a recess for receiving the locking element in the secured position.

37. The axle assembly as claimed in claim 36, wherein the recess comprises a groove in an outer surface of the axle.

38. The axle assembly as claimed in claim 37, wherein the groove extends radially inwardly of the outer surface.

39. The axle assembly as claimed in claim 37, wherein the groove extends circumferentially around the axle.

40. An assembly comprising:
a wheel, an axle, and a journal for coupling the wheel to the axle;
the journal being configured to be mounted in a bore of the wheel;
the journal having a reception space for receiving the axle; and
the journal comprising a locking element pivotable about a pivot axis substantially parallel to a longitudinal axis of the reception space between a release position in which the axle is removable from the reception space and a secured position in which the axle is secured in position in the reception space.

41. A bin or trash cart comprising:
an assembly of a wheel, an axle, and a journal for coupling the wheel to the axle;
the journal being configured to be mounted in a bore of the wheel;
the journal having a reception space for receiving the axle; and
the journal comprising a locking element pivotable about a pivot axis substantially parallel to a longitudinal axis of the reception space between a release position in which the axle is removable from the reception space and a second position in which the axle is secured in position in the reception space.

* * * * *